Patented Apr. 28, 1925.

1,535,797

UNITED STATES PATENT OFFICE.

LEONARD WICKENDEN, OF FLUSHING, NEW YORK, ASSIGNOR TO INDUSTRIAL CHEMICAL COMPANY, OF NEW YORK, N. Y., A CORPORATION OF NEW YORK.

DECOLORIZING CARBON AND PROCESS OF PRODUCING THE SAME.

No Drawing.    Application filed February 24, 1919.    Serial No. 278,834.

*To all whom it may concern:*

Be it known that I, LEONARD WICKENDEN, a subject of the King of Great Britain, and resident of Flushing, Queens County, State of New York, have made certain new and useful Inventions Relating to Decolorizing Carbons and Processes of Producing the Same, of which the following is a specification.

This invention relates especially to decolorizing carbons for use in decolorizing organic liquids or solutions and to processes of producing such decolorizing carbons from charcoal or other carbonaceous material, such, for instance, as porous carbonized dissolved woody material of the general character of the caustic soda waste liquor from the caustic wood pulp process. Such porous carbonaceous material may advantageously be treated with a dissolved catalytic protective material, such as a solution of salts of iron, manganese, aluminum or magnesium, these salts being apparently adsorbed or deposited within the porous carbonaceous material which can then be dried and calcined at temperatures of 800° to 1000° centigrade more or less in the presence of limited quantities of air or other oxidizing gases which greatly promotes the decolorizing action of the material. Suitable porous charcoal or other carbonized material may be used in this process and very decidedly increased in its decolorizing power and value. In the manufacture of paper from wood or the like by the caustic soda process the digestion of the wood chips in the caustic soda cooking liquor produces in addition to the insoluble cellulose a solution of ligneous or woody material which may with advantage be evaporated substantially to dryness and then dried and carbonized in a suitable kiln in the presence of small or limited quantities of air. When this carbonization is conducted at high heat the resulting material is relatively free from hydrocarbons and highly porous in all directions so as to have a relatively small specific gravity because of its high percentage of voids. For decolorizing purposes this carbonized material is preferably leached to remove soluble inorganic matter and can advantageously in some cases be treated with weak acid solutions, such as sulphuric or hydrochloric acid and then washed and dried. Such crude carbonized material, preferably in substantially uniform granular form or in powdered condition, if desired, may be treated with a solution of such catalyzing salts as above referred to, solutions of manganese or iron chlorides or sulphates being desirable and the carbonaceous material may be soaked or impregnated with weak or moderately strong solutions of these salts which effects the incorporation or adsorption of considerable proportions of the metallic radical of the salts in the carbonaceous material. This physical union or possibly quasi chemical combination is sufficient in many cases so that repeated washing with water or even with strong acids sufficient to dissolve the metallic radicals of these salts is insufficient to cause their complete removal from the carbonized material. Increase of temperature facilitates this adsorption or incorporation of the catalyzing salt or the metallic radical thereof and for this reason it is usually desirable to heat or boil the carbonized material in the protective catalyzer solution. Granular carbonized material of this character when boiled for ten minutes or so in a two percent solution for instance, of ferric sulphate adsorbed about five percent of iron on a metallic iron basis which could not be removed by repeated washing with hot water. Several percent or so of other metallic catalyzing radicals may be adsorbed or incorporated with such highly porous carbonized material by boiling the same with sulphates of manganese, magnesium, iron or aluminum or the chlorides thereof.

The calcining of the carbonized material and incorporated metallic protective and catalyzing material may be effected in a muffle furnace or other suitable heating furnace or retort, such as a rotary retort in which the material may be substantially uniformly heated to temperatures of 800° to 950° C. more or less in the presence of suitable slightly oxidizing gases, such as diluted air or carbon-dioxide or mixtures thereof which seem to effect a regulated oxidizing action on the carbonized material and form or produce very finely divided or activized carbon within its pores apparently through the reversible reaction by which carbon-monoxide produces or deposits exceedingly fine carbon when it is transformed into the carbon-dioxide condition. This action, which seems to be considerably promoted by the presence of such metallic catalyzing material in the carbon, is accompanied by a gradually wasting away or oxidation of carbonaceous material which is very greatly retarded by the presence of these metallic catalyzing elements incorporated as above described in the porous carbonized material. This finely disseminated metallic material seems to have a protective action which especially at high heats is of decided importance in preventing oxidation loss of the carbonized material. Under similar oxidizing conditions the oxidation or loss in weight of the carbonaceous material may be reduced to a third or a quarter of the amount of loss when no such catalyzer is incorporated with the carbon, while at the same time the proportion of the deposited or activized carbon seems to remain about the same or is even increased in some cases, as is evidenced by a corresponding increase in the decolorizing power of the carbon after such calcining treatment. As an example of this action two samples of similar porous carbonized material of this general character were calcined side by side in a muffle furnace at a temperature of about 900° centigrade and after a thirty minute calcination the untreated carbon had lost about fifty percent of its weight while the sample of carbonized material which had previously been impregnated or incorporated with ferric chloride to deposit catalytic or protective iron therein only lost about twelve percent of its weight, the decolorizing power of the two carbons being practically identical in this case. The iron impregnated sample of carbon was then treated for a further period in the calcining furnace so that its total loss then amounted to about 48 percent, while the decolorizing power of this material was found to have increased about seventy-five percent as compared to the original calcined material of the two comparative samples. The difference in loss as between the untreated and the impregnated carbon increases materially with increase in the calcining temperature and two similar samples of porous decolorizing carbon of this general character, one of which had been similarly impregnated with ferric chloride before being calcined at still higher temperature, lost about ten percent of its weight, while the untreated carbon under the same conditions lost eighty percent of its weight. What was still more remarkable, the decolorizing value of the treated carbon was found to be ninety percent greater per unit weight after this calcining treatment than the untreated or carbonized material.

In some cases where acid materials are to be decolorized, it is desirable to remove from the calcined and activized decolorizing carbon a considerable proportion at least of the incorporated metallic catalytic or protective material which has been used to prevent undesirable destructive oxidation during the calcination. For this purpose an acid treatment may be given to the calcined material which may be boiled in a solution of sulphuric or hydrochloric acid, for instance, and then after washing, the material may be dried and packaged for shipment and use. This acid purifying treatment may furthermore be used in connection with the treatment of further amounts of decolorizing carbon. Where, for instance, the original raw decolorizing carbon is boiled in a two percent solution of manganese sulphate the impregnated decolorizing carbon after washing and filtration separation may be dried and then calcined for thirty or forty minutes more or less at a temperature of about 900° centigrade after which it is of course cooled preferably out of contact with undesirable oxidizing material. The calcined decolorizing carbon may then be boiled in a five percent solution of sulphuric acid in order to remove the loosely combined manganese from the carbon and this solution may of course be used for impregnating other charges of the decolorizing carbon in this general way. After such acid washing treatment it is usually desirable to wash the carbonaceous material repeatedly and then dry and heat it to redness for a few minutes, although this is not in all cases necessary.

The decolorizing activity of these carbonized materials was tested according to the Wickenden-Hassler method described in the Journal of Industrial and Engineering Chemistry of June, 1916, volume 8, page 518. This decolorizing test involves the decolorizing of a standard solution of anilin red (Soudan III) in kerosene oil and 100 units of this standard test which is referred to as the kerosene red test corresponds to the complete decolorizing of a water solution containing .25 grams of aniline red of the grade technically known as scarlet R. The units of this standard scale are of substantially constant value throughout so that when 10 grams of decolorizing carbon have a decolorizing value of 100 units on this standard kerosene red scale, 5 grams of the same material would have a value of 50 units and other quantities in similar proportion. On this basis one sample of crude decolorizing carbon prepared from soda pulp waste liquor had a decolorizing value of about 70 units. Such material when impregnated with a two per cent solution of ferric chloride and calcined for about thirty minutes at a temperature of approximately 900° centigrade had a decolorizing value of 185 units by this standard test and the material after being calcined at about this temperature for seventy minutes had a decolorizing value of 325 units on this scale. Other samples of generally similar decolorizing carbon calcined in connection with such protective or catalytic metallic material have produced decolorizing carbon having a value of considerably over 400 units on this scale. For purposes of comparison several other high grade decolorizing carbons which are sold on the market gave the following results according to this standard decolorizing test. "Norit" had a decolorizing value of about 140 units and "Eponite" had a value of about 120 units.

This invention has been described in connection with a number of illustrative embodiments, arrangements, materials, concentrations, methods, temperatures and times of treatments, to the details of which disclosure the invention is not of course to be limited, since what is claimed as new and what is desired to be secured by Letters Patent is set forth in the appended claims.

1. The process of increasing the decolorizing power of porous, carbonized material which comprises boiling said material in an aqueous solution of manganese sulphate and effecting adsorption of the metallic radical thereof, and calcining the impregnated material at a temperature of about 800° to 900° centigrade in the presence of carbon-dioxide to effect the limited oxidation of said carbonized material and greatly increase its decolorizing power without undesirable oxidation loss thereof.

2. The process of increasing the decolorizing power of porous adsorbtive carbon which comprises heating said material in a solution of a manganese salt which is not an oxidizing agent, and calcining the impregnated material at a temperature of over 800° centigrade to effect the limited oxidation of said carbonized material and greatly increase its decolorizing power with relatively small oxidation loss thereof.

3. The process of greatly increasing the decolorizing power of the porous, carbonized residue from a woody solution which comprises intimately incorporating with said material dissolved metallic catalyzing and protective material of the iron group, which is not an oxidizing agent, and effecting adsorption of the metallic radical thereof, and calcining the impregnated material at a temperature of between about 800° to 950° centigrade in the presence of carbon-dioxide to effect the retarded oxidation and activation of said carbonized material and greatly increase its decolorizing power while it is protected by such incorporated protective material to minimize undesirable oxidation loss thereof.

4. The process of greatly increasing the decolorizing power of the porous, carbonized residue from a woody solution which comprises intimately incorporating with said material dissolved metallic protective material, which is not an oxidizing agent, and effecting adsorption of the metallic radical thereof, and calcining the impregnated material at a temperature of between about 800° to 950° centigrade in the presence of carbon-dioxide to effect the retarded oxidation of said carbonized material and greatly increase its decolorizing power while it is protected by such incorporated protective material to minimize undesirable oxidation loss thereof.

5. The process of increasing the decolorizing power of the porous, carbonized residue from a woody solution which comprises intimately incorporating with said material dissolved metallic protective material, which is not an oxidizing agent, and effecting adsorption of the metallic radical thereof, and calcining the impregnated material at a high temperature to effect the regular oxidation of said carbonized material and increase its decolorizing power while it is protected by such incorporated protective material to minimize undesirable oxidation loss thereof.

6. The process of increasing the decolorizing power of adsorptive carbon which comprises incorporating therewith dissolved metallic protective material of the iron group, which is not an oxidizing agent, and calcining the impregnated material at a temperature of over 800° centigrade in the presence of oxidizing gas to effect the retarded oxidation of portions of said carbonaceous material while oxidation thereof is minimized by said protective material and dissolving out considerable proportions of such protective material.

7. The process of increasing the decolorizing power of porous adsorptive carbon which comprises incorporating therewith dissolved metallic protective material, which is not an oxidizing agent, and calcining the impregnated material at a temperature of over 800° centigrade in the presence of oxidizing gas to effect the retarded oxidation of portions of said carbonaceous material while oxidation thereof is minimized by said protective material and dissolving out considerable proportions of such protective material.

8. The process of increasing the decolorizing power of porous adsorptive carbon which comprises incorporating therewith dissolved metallic protective material, which is not an oxidizing agent, and calcining the impregnated material at a temperature of over 800° centigrade in the presence of oxidizing gas to effect the retarded oxidation of portions of said carbon while oxidation thereof is minimized by said protective material.

9. The herein described carbon, having the structure and internal surface characteristics produced by treating the residue of a carbonized woody solution with a protective metallic salt solution which is not an oxidizing agent, and subjecting the so treated carbon to a temperature of 750 to 1000° C. in an atmosphere of limited oxidizing capacity, substantially as described.

10. The herein described carbon, having the structure and internal surface characteristics produced by treating a porous adsorbtive carbon with a solution of a protective metallic salt, which is not an oxidizing agent, and subjecting the so treated carbon to temperature of 750° to 1000° C. in an atmosphere of limited oxidizing capacity substantially as described.

11. The herein described carbon, having the structure and internal surface characteristics produced by treating the residue of a carbonized woody solution with a manganese salt solution, which is not an oxidizing agent, and subjecting the so treated carbon to a temperature of 750° to 1000° C. in an atmosphere of limited oxidizing capacity, substantially as described.

12. The herein described carbon, having the structure and internal surface characteristics produced by treating a porous adsorbtive carbon with a solution of a manganese salt which is not an oxidizing agent, and subjecting the so treated carbon to temperature of 750° to 1000° C. in an atmosphere of limited oxidizing capacity substantially as described.

13. The herein described carbon, having the structure and internal surface characteristics produced by treating the residue of a carbonized woody solution with a salt of iron group which is not an oxidizing agent, and subjecting the so treated carbon to a temperature of 750° to 1000° C. in an atmosphere of limited oxidizing capacity, substantially as described.

14. The herein described carbon, having the structure and internal surface characteristics produced by treating a porous adsorbtive carbon with a solution of a salt of the iron group which is not an oxidizing agent, and subjecting the so treated carbon to temperature of 750° to 1000° C. in an atmosphere of limited oxidizing capacity substantially as described.

LEONARD WICKENDEN.